May 2, 1939.  P. D. CAMPBELL  2,156,372

MECHANICAL MOVEMENT

Filed Aug. 25, 1937

INVENTOR,
Phillip D. Campbell.

BY Hovey & Hamilton,
ATTORNEYS.

Patented May 2, 1939

2,156,372

UNITED STATES PATENT OFFICE 2,156,372

MECHANICAL MOVEMENT

Phillip D. Campbell, Kansas City, Mo.

Application August 25, 1937, Serial No. 160,807

4 Claims. (Cl. 74—285)

This invention relates to mechanical movements of the nature which in their most useful embodiment may be built into transmission mechanism, and the primary object of the invention is the provision of such structure, having novelly interconnected drive and driven shafts, and means for selectively transmitting from the drive shaft to the driven shaft, controllable, variable speeds, either greater or less than the speed of the drive shaft.

One of the important aims of this invention is the provision of power transmitting mechanism, wherein is provided a substantially T-shaped drive shaft, having opposed, freely rotatable, beveled pinions on the laterally extending arms of the shaft, and a beveled gear in mesh with said pinions and associated with novel means for driving the said beveled gear to rotate the beveled pinions as they are carried about the axis of rotation of the drive shaft.

A yet further object of the instant invention is the provision, in power transmitting mechanism, having a drive shaft, beveled pinions, and beveled gears as aforesaid, of means for selectively interconnecting the said beveled gear with the drive shaft or the said beveled gear with the means for driving the said beveled gear.

Other objects of this invention include the provision of power transmitting mechanism having a specially disposed disc and friction wheel that is operably connected to the drive shaft and employed to rotate a beveled gear thereon in such a manner as to affect beveled pinions in mesh with said beveled gear so that they transmit selected various speeds to the driven shaft as the friction wheel is manually moved toward and from the axis of rotation of the disc.

This invention contemplates a large number of minor objects, all of which will appear during the course of the following specification, referring to the accompanying drawing, wherein is more or less diagrammatically illustrated the mechanical power transmitting mechanism embodying the invention. In the drawing.

Figure 1:
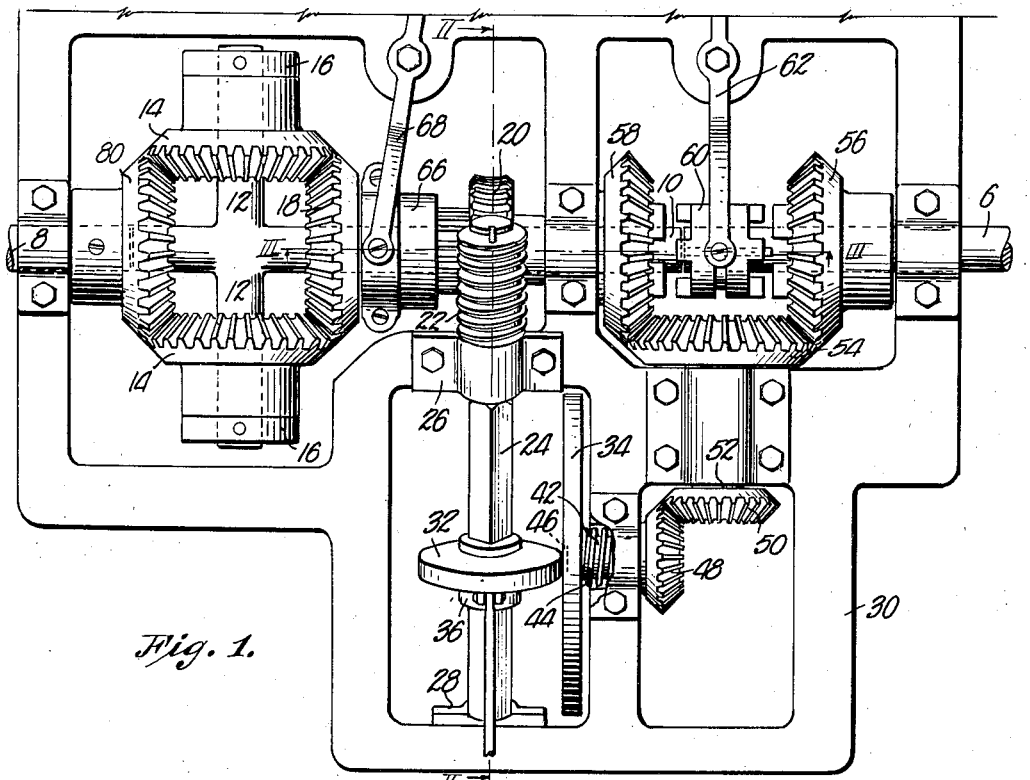
Figure 1 is a top plan view of power transmitting mechanism made in accordance with this invention.

Regardless of what work the mechanism is called upon to perform, there must, of necessity, be present a drive shaft 6 and a driven shaft 8. In the illustrated embodiment there is an intermediate shaft 10, disposed between drive shaft 6 and driven shaft 8, which merely is a part of driving shaft 6 so far as principle is concerned, but which is present to permit reversal of the direction of travel of the driven shaft.

Throughout the specification and claims, therefore, drive shaft 6 and intermediate shaft 10 may be considered one and the same element, unless specific reference to the reversing mechanism is being made.

Intermediate shaft 10 is provided with a pair of diametrically opposed arms 12, which extend laterally from the axis of shaft 10, and each of which is provided with a beveled pinion 14 of identical nature. Like collars 16 on arms 12 maintain beveled pinions 14 in place, and the same are loosely mounted upon arms 12 for free rotation about the aligned axes thereof. A beveled gear 18, loosely mounted upon shaft 10, is in mesh with both beveled pinions 14 and has special relation to worm wheel 20, likewise loose on shaft 10 and in mesh with worm 22, rigid to cross shaft 24, that is journalled for rotation in bearings 26 and 28, forming a part of frame 30. This cross shaft 24 is disposed at an angle so that worm 22 may be in mesh with worm wheel 20 and so that friction wheel 32 may travel along cross shaft 24 through the axis of rotation of disc 34. Cross shaft 24 is squared for a portion of its length so that the squared, slidably mounted bearing 36 that carries friction wheel 32 may move longitudinally along shaft 24 as the shaft is being rotated.

Manually operable means in the form of collar 38 and operating rod 40 presents structure whereby the friction wheel 32 may be moved across the face of disc 34 as the mechanism is being operated. Disc 34 is carried by a stub shaft 42 and has a spring 44 therebehind to yieldably force disc 34 against friction wheel 32. This spring is of a limited nature so that when friction wheel 32 has a portion of its annular periphery in cavity 46, wheel 32 will not be driven by the disc.

Beveled gear 48, carried by stub shaft 42, is in mesh with beveled pinion 50, mounted upon a short shaft 52, which also has a beveled pinion 54 thereon that meshes with both beveled gears 56 and 58 on drive shaft 6 and intermediate shaft 10 respectively. Clutch member 60, which is operated by lever 62, is splined on drive shaft 6; beveled gear 56 is loose on drive shaft 6, and beveled gear 58 is keyed to intermediate shaft 10.

Figure 3:
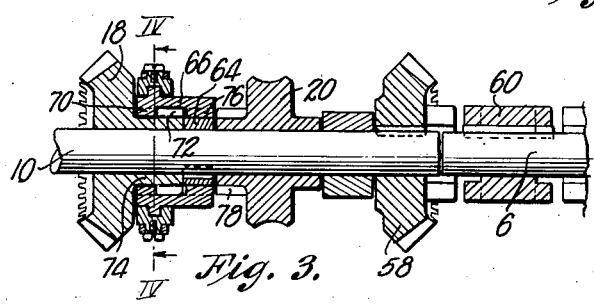
Fig. 3 is a fragmentary, sectional view, taken along line III—III of Fig. 1, and, Fig. 4 is a detailed, cross sectional view, taken along line IV—IV of Fig. 3.
Figure 4:
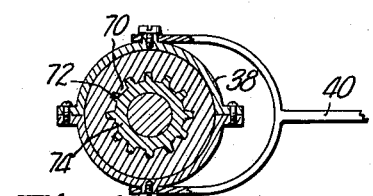

The mechanism disposed between beveled gear 18 and worm 20 is a clutch structure, which upon a certain amount of movement, will secure together shaft 10 and beveled gear 18. Upon further movement, beveled gear 18 will be connected directly to worm wheel 20 and the embodiment of this feature is shown distinctly in Fig. 3. Externally toothed ring 64 is keyed to shaft 10. Collar 66 is movable by lever 68, and is secured thereto in the conventional manner so that the collar may be reciprocated back and forth between gear 18 and worm wheel 20. Collar 66 has internal teeth adjacent its two edges, and is without teeth to present an annular, uninterrupted space between the two sets of teeth. When in the position shown in Fig. 3, internal teeth 70 of collar 66 engage teeth 72 formed on hub 74 of gear 18, and teeth 76 engage the external teeth of ring 64. Such disposition of parts, therefore, secures together shaft 10 and gear 18. Upon movement of collar 66, the external teeth of ring 64 will travel around in the annular path formed between the sets of teeth 70 and 76 and teeth 70 will remain in mesh with teeth 72 of gear 18, while teeth 76 will mesh with external teeth 78 formed on the adjacent hub of worm wheel 20.

Worm wheel 20 and gear 18 will, therefore, be directly interconnected independently of shaft 10 and both may move about the axis of the latter to drive pinions 14 during the operation of the mechanism. Beveled gear 80 is in mesh with both pinions 14, and is secured directly to driven shaft 8.

The foregoing is a complete description of the preferred embodiment of the invention as it is illustrated, and the method of operation will further disclose the advantages of such a mechanical movement.

*Operation*

Assuming that it is desirable to rotate driven shaft 8 so that it will move in the same direction as drive shaft 6 and that the mechanism associated therewith will move forwardly, as an example, drive shaft 6 will be rotated by any suitable source of power in that said forward direction. The movement of drive shaft 6 is transmitted to beveled gear 58 by clutch member 60, which has been moved over into engagement therewith so as to interconnect this gear 58 and drive shaft 6. Gear 58 being keyed to intermediate shaft 10 causes said shaft to rotate and move beveled pinions 14 in their orbit with the supporting arms 12. If beveled gear 18 is connected to shaft 10 through the medium of collar 66 and ring 64, a direct drive is established because the beveled gear 18 then rotates as a unit with drive shaft 10 and the beveled pinions 14 do not rotate about their common axis on arms 12. The beveled gear 80 is thereby securely associated with the assembly and locked thereinto as a part of the unit, and the unit comprising beveled gears 18 and 80 and beveled pinions 14 rotates en masse with drive shaft 10 and no variable speed is obtained.

Reversing the direction of travel of driven shaft 8 may be accomplished by moving clutch member 60 into engagement with the hub teeth on beveled gear 56. In so disposing the parts, beveled gear 58 is driven in an opposite direction because the rotation of intermediate shaft 10 is reversed through the medium of beveled pinion 54.

When the mechanism is to be used with the parts thereof that permit of variable speeds within a wide range both above and below the speed of drive shaft 6, collar 66 is shifted so that it directly interconnects beveled gear 18 and worm wheel 20 as above set down. With clutch member 60 in engagement with beveled gear 58, shaft 10 will be rotated to move the driven shaft forwardly or in the same direction as drive shaft 6. Beveled pinion 54 will drive beveled pinion 50 and beveled gear 48 to rotate disc 34 and with friction wheel 32 in the position shown in Figs. 1 and 2, an over-drive is established and the speed of rotation of driven shaft 8 is twice the speed of rotation of drive shaft 6. This relation of shafts 6 and 8 is true because gear 18 is held in an immovable position by worm 22 and worm wheel 20, and pinions 14 rotate on their axes on arms 12 around beveled gear 18 to impart revolutions to driven shaft 8 through beveled gear 80. When friction wheel 32 is moved to the left as viewed in Fig. 2, it will rotate cross shaft 24 with increasingly greater speed as the periphery of disc 34 is approached. The over-drive ratio of one to two between drive shaft and driven shaft 6 and 8 respectively is gradually increased to a point of greatest over-drive when friction wheel 32 reaches the marginal edge of disc 34. This speed of rotation of cross shaft 24 is imparted to worm wheel 20 and thence through parts 66, 70, 72 and 78 to beveled gear 18, the speed of which is correspondingly increased so as to increase the speed of driven shaft 8 over that which is being imparted thereto through the rotation of shaft 10 and the movement of pinions 14 in their orbit when the overdrive is in operation.

Figure 2:
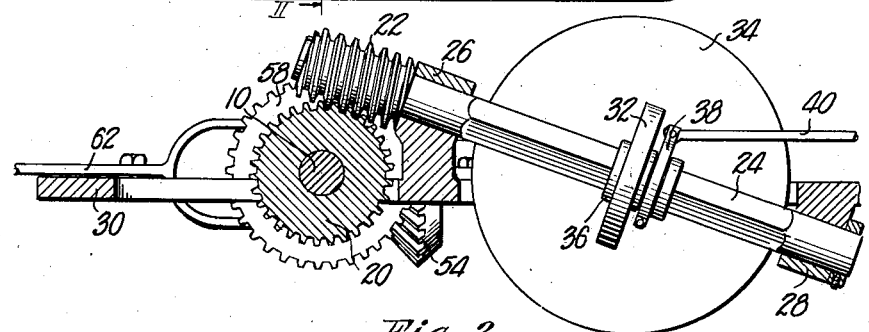
Fig. 2 is a fragmentary, cross sectional view, taken on line II—II of Fig. 1.

To progressively decrease the speed of driven shaft 8 below that which is being imparted thereto by shaft 10 when disc and friction wheel 34 and 32 respectively are in the position shown, friction wheel 32 is moved to the right as viewed in Fig. 2. When so moved cross shaft 24 will be rotated with increasingly greater speed as the periphery of disc 34 is approached. This speed of rotation is imparted to worm wheel 20 and thence through parts 66, 70, 72 and 78 to beveled gear 18, the speed of which is correspondingly increased so as to decrease the speed of driven shaft 8 under that which is being imparted thereto through the rotation of shaft 10 and the movement of pinions 14 in their orbit.

From the foregoing it will be apparent to one skilled in the art that this mechanism is susceptible of wide and flexible uses, and while the preferred embodiment has been illustrated and described, it is desired to be limited only by the spirit of the invention and scope of the appended claims.

Having thus described the invention, what is claimed as new and desired to be secured by Letters Patent is:

1. In mechanism of the character described a drive shaft, an intermediate shaft having a pair of diametrically opposed, laterally extending arms rigid therewith; a beveled pinion loosely mounted for free rotation on each arm respectively; a beveled gear on the intermediate shaft in mesh with both of the pinions; a worm wheel on the intermediate shaft in selective connection with said beveled gear for rotation therewith; a cross shaft; a worm on the cross shaft in mesh with the worm wheel to drive the same and said beveled gear; a disc; mechanism actuated by the drive shaft for rotating the disc; a friction wheel slidably mounted on the cross shaft and in engagement with the disc; means for moving the friction wheel along the cross shaft to vary the speed of rotation of the said worm and beveled gear; a driven shaft; and a beveled gear on the driven shaft in mesh with the pinions on the said arms.

2. In mechanism of the character described a drive shaft, an intermediate shaft having a pair of diametrically opposed, laterally extending arms rigid therewith; a beveled pinion loosely mounted for free rotation on each arm respectively; a beveled gear on the intermediate shaft, in mesh with both of the pinions; a worm wheel loosely mounted on the intermediate shaft adjacent to the beveled gear; a worm in mesh with the worm wheel to drive the same; mechanism actuated by the drive shaft for driving the worm at various speeds; a clutch between said beveled gear and worm wheel for selectively interconnecting the beveled gear and intermediate shaft or the beveled gear and worm wheel; a driven shaft; and a beveled gear on the driven shaft in mesh with the pinions on the said arms.

3. In mechanism of the character described, a drive shaft, an intermediate shaft having a pair of diametrically opposed, laterally extending arms rigid therewith; a beveled pinion loosely mounted for free rotation on each arm respectively; a beveled gear on the intermediate shaft in mesh with both of the pinions; a worm wheel loosely mounted on the intermediate shaft adjacent to the beveled gear; a clutch between the beveled gear and said worm wheel for selectively interconnecting the beveled gear and intermediate shaft or the beveled gear and worm wheel; a cross shaft; a worm on the cross shaft in mesh with the worm wheel to drive the same; a disc; mechanism actuated by the drive shaft for rotating the disc; a friction wheel slidably mounted on the cross shaft in engagement with the disc; means for moving the friction wheel along the cross shaft in a path of travel extending across the center of said disc; a driven shaft; and a beveled gear on the driven shaft in mesh with the pinions on the said arms.

4. In mechanism of the character described, a drive shaft, an intermediate shaft having a pair of diametrically opposed, laterally extending arms rigid therewith; a beveled pinion loosely mounted for free rotation on each arm respectively; a beveled gear on the intermedaite shaft in mesh with both of the pinions; a worm wheel loosely mounted on the intermediate shaft adjacent to the beveled gear; a clutch between the beveled gear and said worm wheel for selectively interconnecting the beveled gear and intermediate shaft or the beveled gear and worm wheel; a cross shaft; a worm on the cross shaft in mesh with the worm wheel to drive the same; a disc; mechanism actuated by the drive shaft for rotating the disc; a friction wheel slidably mounted on the cross shaft in engagement with the disc; means for moving the friction wheel along the cross shaft in a path of travel extending across the center of said disc; a driven shaft; and a beveled gear on the driven shaft in mesh with the pinions on the said arms, said disc having a cavity formed inwardly from the face thereof engaging said friction wheel, at the axis thereof whereby to render the friction wheel static when positioned at the exact center of said disc.

PHILLIP D. CAMPBELL.